H. G. MOSCHERROSCH & P. G. SCHWARTZ.
ATTACHMENT FOR SHOVELS.
APPLICATION FILED MAR. 5, 1918.
1,300,452.  
Patented Apr. 15, 1919.
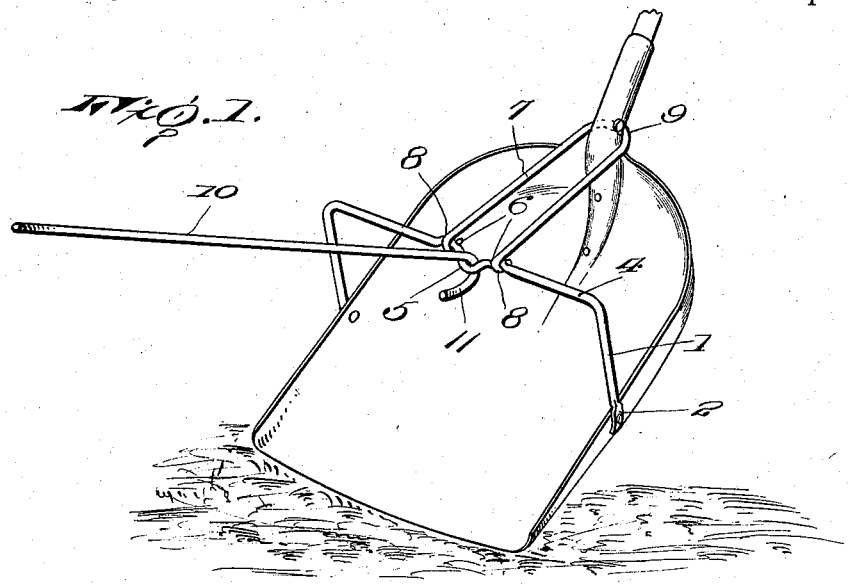
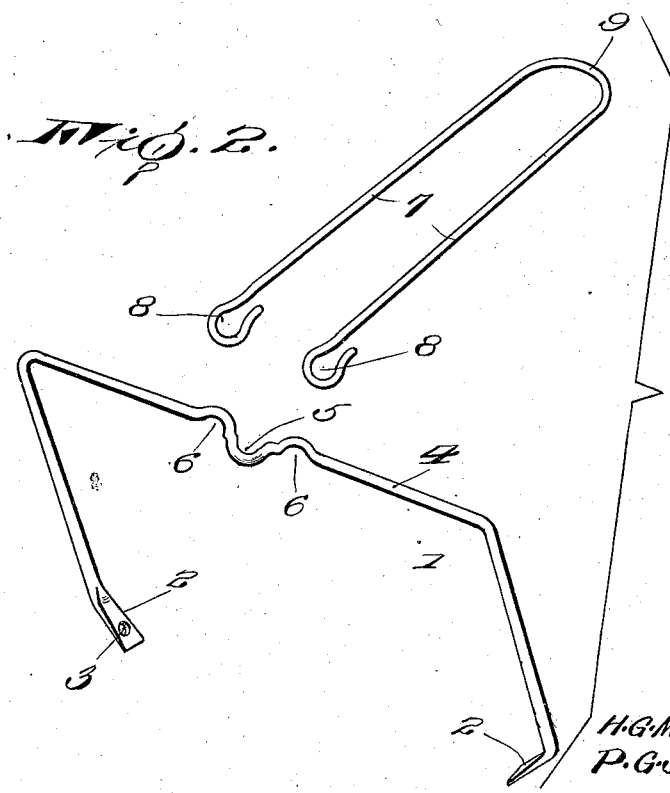
Inventors.  
H. G. Moscherrosch  
P. G. Schwartz  
By Lacey & Lacey  
Attorneys

UNITED STATES PATENT OFFICE.

HARRY G. MOSCHERROSCH AND PETER G. SCHWARTZ, OF APPLETON, WISCONSIN.

ATTACHMENT FOR SHOVELS.

1,300,452.   Specification of Letters Patent.   Patented Apr. 15, 1919.

Application filed March 5, 1918. Serial No. 220,631.

*To all whom it may concern:*

Be it known that we, HARRY G. MOSCHERROSCH and PETER G. SCHWARTZ, citizens of the United States, residing at Appleton, in the county of Outagamie and State of Wisconsin, have invented certain new and useful Improvements in Attachments for Shovels, of which the following is a specification.

This invention is an attachment for shovels and has for its object the provision of a simple and inexpensive device which may be applied to any shovel and by the use of which the shovel may be handled by two men so that the work of taking up broken stone or other material may be expeditiously performed.

The invention is illustrated in the accompanying drawings, in which—

Figure 1 is a perspective view of the device applied to a shovel;

Fig. 2 is a detached perspective view of the shovel engaging members separated but in their proper approximate positions.

In carrying out this invention, we employ a bail 1 having the ends of its side members or legs turned inwardly, as indicated at 2, so as to conform to the shape of the edges of a shovel or scoop and provided with perforations 3 through which bolts or rivets may be inserted so as to permanently or detachably secure the bail to the sides of the shovel, as shown in Fig. 1. The cross-bar 4 of the bail is bent forwardly at its center so as to provide a hook or notch 5 and at the sides of said forwardly bent portion said cross-bar is bent rearwardly so as to provide notches or recesses 6, the combined bends giving the bail at its center a substantially W-shaped portion and furnishing alternate reëntrant angles as clearly shown in Fig. 2. We also employ a U-shaped link or bail 7 having hooks 8 at the ends of its side members which are adapted to engage around the cross-bar of the bail 1 and fit in the notches or angles 6 as shown in Fig. 1 and as will be readily understood. The closed end of this U-shaped link or bail 9 passes around the handle of the shovel immediately adjacent the rear edge of the shovel as shown in Fig. 1 so that any pulling force exerted upon the bail 1 will be transmitted to the shovel handle. We also employ a draft rod 10 which may be of any convenient form and is provided at its rear end with a hook 11 adapted to engage around the cross-bar of the bail 1 and engage within the reëntrant angle or notch 5.

The use of the device will be readily understood. One workman presses down upon the handle of the shovel so as to hold it to the work and guide it while another workman by grasping the rod or draft bar 10 and pulling upon the same draws the shovel along under the stone or other material to be taken up. It will be readily seen that by dividing the labor in the manner described, the work of taking up the material will be more expeditiously performed and with less strain upon the laborers. The bail 4 should extend a sufficient distance above the shovel or scoop to hold the link 7 substantially horizontal so that the pull exerted through the draft rod 10 will be transmitted in a direct line to the handle of the shovel. When the shovel has been filled, the workman handling the draft rod may turn it to a vertical position and so utilize it as a lifter to aid the other workman in raising the load and carrying it to the place of deposit, a heavier and larger load being thus handled than would be possible by one workman alone.

Our device may be applied to any shovel and if riveted to the sides of the same will be permanently attached but if bolts be employed it may be readily removed from the shovel, when the same is worn to such extent as not to be further available, and may then be applied to a new shovel. The shovels may be constructed with openings in their side edges to receive the fastening device or the said openings may be formed in the said edges after they have reached the place of use. The device may be made from rods of circular cross-section as illustrated in the drawings, or may be made from flat bars as will be readily understood and the reverse bends given the central portion of the cross-bar 4 will hold the hooks 8 and 11 in their proper operative positions so that the draft applied to the bail 1 will be most advantageously employed. The device is obviously simple and inexpensive and will be found highly efficient for the purpose for which it is designed.

Having thus described our invention, what is claimed as new is:

1. An attachment for a shovel having a rigid handle rising from its rear end comprising a bail adapted at its ends to be secured to the edges of the shovel and provided at its center with alternate reversely arranged reëntrant angles, a draft rod to engage one of said reëntrant angles, and a link to pass around the shovel handle and engage others of said reëntrant angles.

2. An attachment for a shovel having a rigid handle permanently secured to and rising from its rear end comprising a bail adapted to be secured to the side edges of the shovel and provided at the center of its top with reversely disposed bends forming alternate reëntrant angles, a draft hook to engage the central reëntrant angle, and a U-shaped link passing around the shovel handle and provided at its front ends with hooks to engage the outer reëntrant angles of the bail.

In testimony whereof we affix our signatures.

HARRY G. MOSCHERROSCH. [L. S.]
PETER G. SCHWARTZ.

Copies of this patent may be obtained for five cents each, by addressing the "Commissioner of Patents, Washington, D. C."